United States Patent [19]
Stoll et al.

[11] Patent Number: 5,568,982
[45] Date of Patent: Oct. 29, 1996

[54] LINEAR DRIVE

[75] Inventors: Kurt Stoll, Esslingen; Albrecht Wagner, Winterbach; Eric Angué, Stuttgart, all of Germany

[73] Assignee: Festo KG, Essling, Germany

[21] Appl. No.: 541,856

[22] Filed: Oct. 10, 1995

[51] Int. Cl.[6] .................................................. F16C 29/04
[52] U.S. Cl. ................... 384/55; 384/45; 384/50
[58] Field of Search ................... 384/21, 26, 40, 384/41, 42, 43, 45, 49, 50, 55, 59

[56]  References Cited

U.S. PATENT DOCUMENTS

| | | | |
|---|---|---|---|
| 4,699,042 | 10/1987 | Stoll | 91/44 |
| 4,856,415 | 8/1989 | Noda | 384/42 X |
| 5,088,839 | 2/1992 | Tsukada | 384/45 |
| 5,297,873 | 3/1994 | Komiya | 384/21 X |
| 5,330,272 | 7/1994 | Stoll | 384/26 |

FOREIGN PATENT DOCUMENTS

| | | | |
|---|---|---|---|
| 603459 | 6/1994 | European Pat. Off. | 384/55 |
| 3506491 | 8/1986 | Germany . | |
| 3802703 | 8/1988 | Germany . | |
| 4206751 | 9/1993 | Germany . | |

Primary Examiner—Thomas R. Hannon
Attorney, Agent, or Firm—Hoffmann & Baron

[57] ABSTRACT

A linear drive, on which housing a longitudinally moving output drive part is provided. In the possible path of motion thereof a limiting device is arranged, with which the end or terminal position of the output drive part may be preset. The limiting device comprises at least one holder with an abutment-shock absorber unit. Along the housing a plurality of positioning points is provided, at which support element may be fixed in place, which render possible an interlocking or positive mounting of the holder. The abutment-shock absorber unit is able to be steplessly set in position in relation to the holder. It is in this manner that an exact and reliable adjustment of the path of travel of the output drive part may be undertaken.

20 Claims, 4 Drawing Sheets

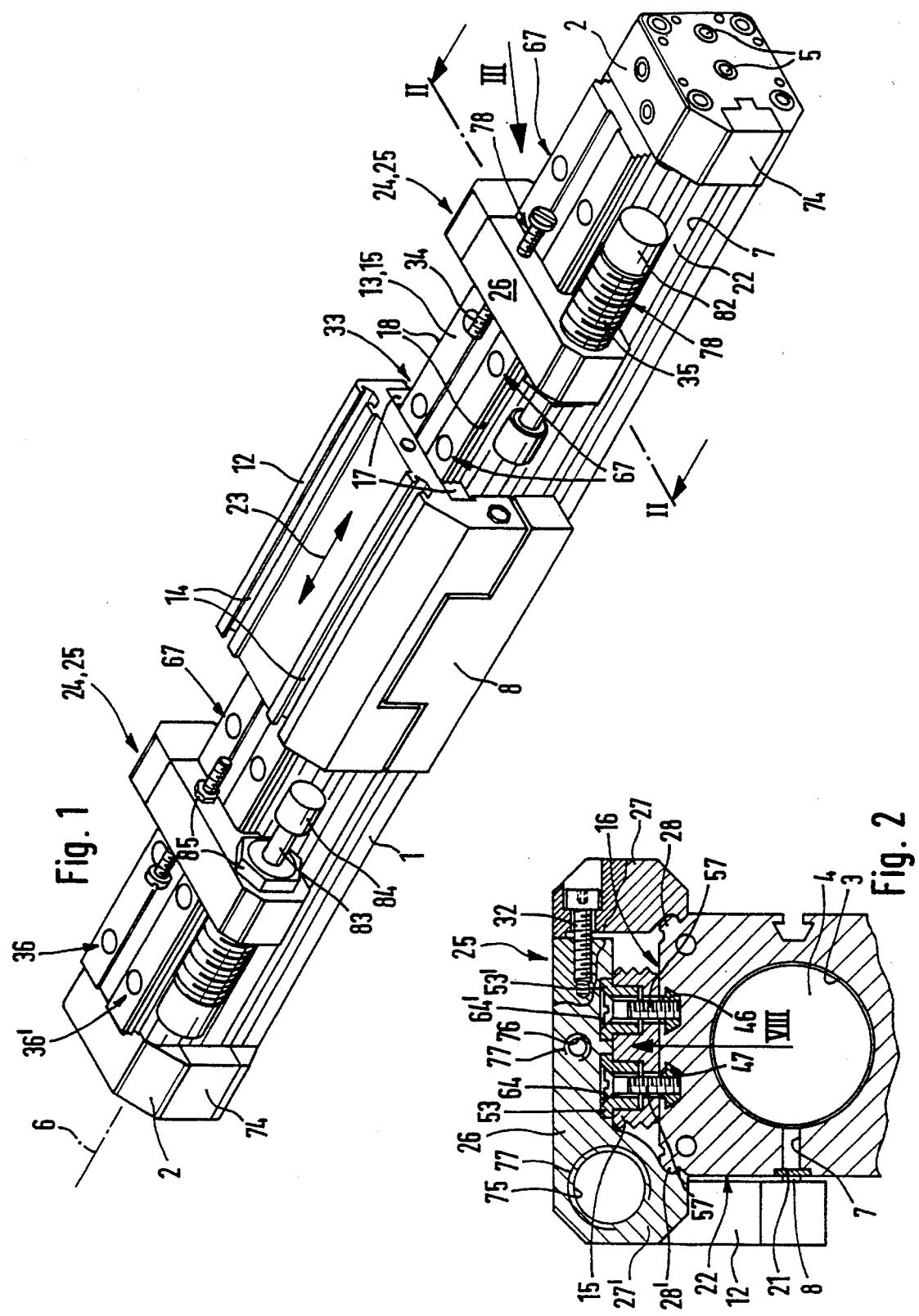

LINEAR DRIVE

BACKGROUND OF THE INVENTION

The invention relates to a linear drive comprising a housing which contains a drive part kinetically coupled drivingly with an output drive part which is movingly arranged outside the housing on a longitudinal guide extending in the longitudinal direction thereof, a device arranged outside the housing and cooperating with the output drive part for limiting the travel of the output drive part, which device comprises at least one holder adapted to be set in fixed relationship to the housing along a setting range in different longitudinal positions, and an abutment-shock absorber unit arranged on the holder and extending into the path of travel of the output drive part.

THE PRIOR ART

A linear drive of this type is disclosed in the German patent publication 4,206,751 A1. Here it is a question of a so-called slotted cylinder comprising a fluid actuated piston constituting the drive part and connected drivingly via a drive dog, which projects through the longitudinal slot in the housing, with a carriage-like output drive part. On the output drive part it is possible to secure any desired load which is to be moved. In order to render possible an adjustable preset for the possible travel paths of the output drive part a limiting device is provided, which comprises two limiting units arranged on either side of the output drive part. Each of such limiting units is made up of a steplessly adjustable holder, which is able to be clamped on the housing, and furthermore an abutment-shock absorber unit arranged on the holder. The abutment may in this case be constituted by the shock absorber itself or by a surface provided on the holder. When the output drive part reaches its end or terminal position, its kinetic energy is dissipated by the shock absorber, before it strikes the abutment presetting its terminal position.

By changing the longitudinal position of a respective holder, i.e. the position in the longitudinal direction of the housing of the linear drive, it is possible to steplessly set the terminal position of the path of travel of the output drive part. However, owing to the heavy impact in the course of prolonged operation a gradual drift in the longitudinal position of the clamped on holder is to be expected. This leads to inaccuracy in operation, which may in turn be responsible for damage to the loads being handled. A regular check on the set position is therefore essential.

SHORT SUMMARY OF THE INVENTION

One object of the present invention is to provide a linear drive in the case of which an exact and permanent setting of the terminal position of the output drive is feasible.

In order to achieve these and/or other objects appearing from the present specification, claims and drawings, the present invention contemplates the provision of a plurality of spaced positioning points along the range of setting, at which respectively at least one support element is or may be arranged in fixed relationship to the housing, the holder is adapted to be arranged and to be secured at each of these positioning points, which are provided with at least one support element, in at least one support setting corresponding to a given longitudinal position, in the support setting an engaging portion provided on the holder is hookingly engaged by the associated support element on the side facing away from the output drive part and is supported in the longitudinal direction, and furthermore the abutment-shock absorber unit is arranged on the holder for stepless adjustment in the direction of travel of the output drive part.

The invention accordingly represents a departure from the prior art design with a possibility of stepless adjustment of the holder and provides merely for stepped positioning in individual longitudinal positions, in which however, even in the case of a very heavy impact of the output drive part holding of the set position is ensured. The cause of this is virtually interlocking engagement between the holder and at least one support element, which is constantly fixedly applied or may be so applied as required at a positioning point joined to the housing. Owing to securing the holder so that it cannot be dislodged the individual holder setting are termed support settings. Since a plurality of such positioning settings are present distributed along the range of adjustment, different support settings may be provided for so that in case of need practically the entire path of the output drive part may be coped for. The stepless fixation of the holder is complemented by a stepless possibility of setting of the abutment-shock absorber unit in order still to be able to very exactly set the desired terminal position.

The device for limiting the path of travel may consequently not only employed in connection with linear drives operated by fluid under pressure, but also for example in the case of linear drives with an electrical drive means.

Advantageous further developments of the invention will be gathered from the claims.

Although owing to the possibility of a compact design the abutment-shock absorber unit may be readily fixed securely on the holder exclusively by means of a clamping device at least one additional interlocking or positively acting connection would appear to be advantageous for prolonged periods of use. In this respect mounting on the holder by means of a screw threaded connection appears to be an advantage. In this case the abutment and the shock absorber may be designed separately and be arranged on the holder so as to be separately adjustable. Preferably the respective part comprises on its outer periphery an external screw thread, with which it may be screwed in the direction of travel of the output drive part steplessly in relation to an internal screw thread provided on the holder. For preventing rotation with respect to the respectively set position in relation to the holder it is possible for instance to employ a clamping device or at least one lock nut, for example.

A fine graduation of the support setting with a comparatively small number of positioning settings may be provided for in an advantageous fashion if the holder is provided with a plurality of engaging portions spaced out in the direction of travel of the output drive part, which portions may be selectively associated with one and the same support element, in which the holder is respectively support on the rear side. If each such support element constitutes a projection, it is possible for at least one engaging portion to be formed by the edge of a recess in the holder, into which the support element fits in one possible support setting. On one and the same holder it is possible to provide a plurality of such recesses one after the other in sequence. Furthermore, the rear side, facing away from the output drive part, of the holder may be employed as the engaging portion, which may bear against the proud support element.

It is convenient if at least one support element is designed in the form of a separate component, which if required is anchored at a desired positioning point. The number of the necessary support elements is then reduced to a minimum. Furthermore such design renders possible a compact manner of construction of the linear drive without impairing the possibility of movement of the output drive part by obstructing support elements not currently required.

It is an advantage if at least one row of holes fixed in relation to the housing is provided, such holes being located at the positioning points and if required being able to be fitted with a support element. If the linear drive is provided with a guide rail for providing a plain or roller bearing means for the output drive part, it is possible to use a row of holes provided for attachment of the guide rail, if for example one of the attachment elements, is replaced by another one and a support element is also fixed in place with the same simultaneously.

In addition to the practically positive or interlocking support of the holder it is expedient to provide the possibility of a non-positive of frictional clamping connection for securing the holder on the housing. In the case of linear drives, which are provided with a guide rail, such clamping preferably does not take place on the guide rail so that plain bearing or running surfaces provided on the same are not damaged.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 1 shows a first design of the linear drive fitted with a limiting device in a perspective view.

FIG. 2 shows a cross section taken on the section line II—II through the linear drive of FIG. 1 adjacent to a limiting unit without showing the abutment-shock absorber unit.

DETAILED ACCOUNT OF WORKING EMBODIMENTS OF THE INVENTION

Figure 3:
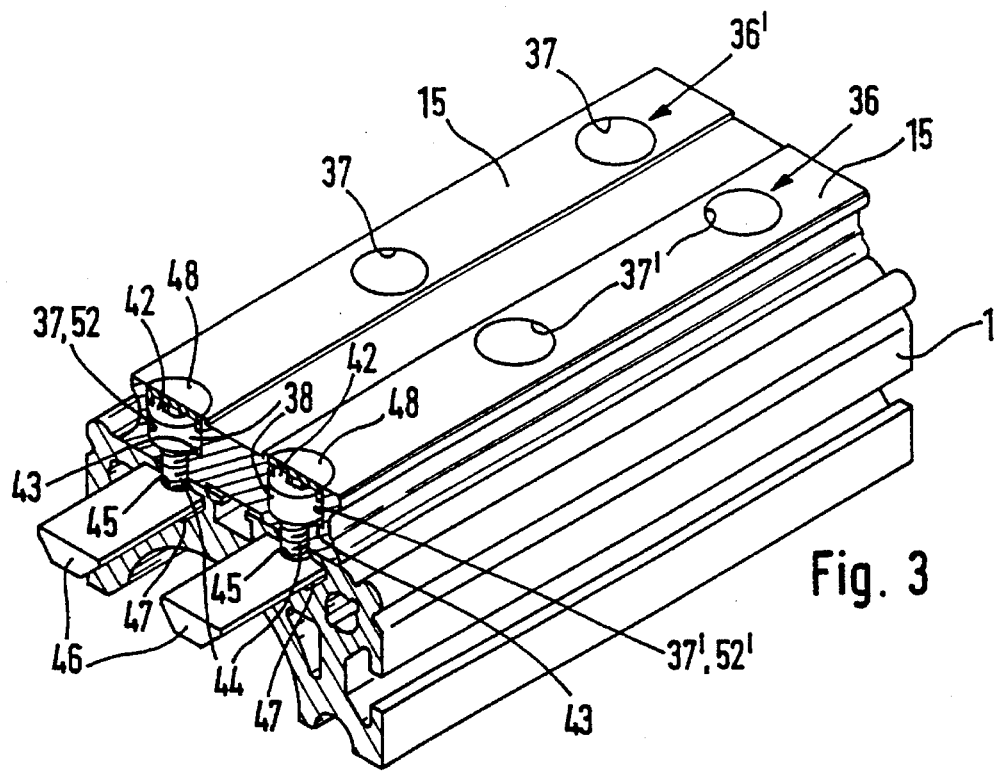
FIGS. 3 through 7 show a portion of the linear drive of FIGS. 1 and 2 looking in the direction generally indicated by the arrow III, showing individual phases and possibilities in order to position a limiting unit on the housing of the linear drive.

The linear drive depicted by way of example is designed in the form of a fluid power and more particularly pneumatically operated power cylinder and belongs to the category of so-called piston rod-less power cylinders. It comprises an elongated tubular housing 1 which is preferably extruded as a section, end plates 2 or caps being mounted on the two ends of the housing. In the interior of the housing 1 there is a preferably circular cylindrical working space 3, which receives a piston constituting a drive part 4. Via connection ports 5 provided in the end plates 2 the supply or discharge of drive fluid to or from the chambers, which are sealingly separated from each other, of the working space 3 is possible. It is in this manner that the drive part 4 may be driven to perform a reciprocating longitudinal movement in relation to the housing 1. For instance both connection ports 5 may be provided on one and the same end plate 2, the connection with the oppositely placed chamber being via fluid ducts (not illustrated) integrated in the housing 1.

At one point on its periphery the housing 1 possesses a longitudinal slot 7 which extends in the longitudinal direction of the housing and penetrates the housing radially. Such slot has a drive dog 8 extending through it, which is secured to the drive part 4 and outside the housing 1 is connected with a carriage-like output drive part 12. The latter runs reciprocatingly on a longitudinal guide 13 provided on the housing 1 in the longitudinal direction 6. Since the drive part 4, the drive dog 8 and the output drive part 12 constitute a drivingly or kinetically interconnected unit, the output drive part 12 directly participates in the movement of the drive part 4. Assembly aids 14 mounted on the output drive part 12 permit the attachment thereto of any desired structure or load, not illustrated in detail, which is to be shifted by the linear drive.

In the illustrated working embodiment the longitudinal guide 13 is constituted by a guide rail 15, which is secured detachably to the external surface of the housing 1. The respective section 16 of the external surface of the housing 1 is for this purpose more particularly made in the form of a flat. Preferably the housing 1 generally possesses a rectangular or square outline, the guide rail 15 being attached to one of the four sections of the external surface.

Via suitable bearing means 17 the output drive part 12 is in guiding contact with the guide rail 15. The guiding contact may as illustrated be a plain contact as in the present working example of the invention or one using roller elements. In the case of the bar-like guide rail 15, whose rail plane is parallel to the external surface section 16, the two mutually opposite narrow edge portions of the guide rail 15 are designed as guide contact surfaces 18.

As a seal means to prevent escape of fluid and the ingress of dirt the longitudinal slot 7 is preferably covered over both on the outside and also on the inside with a flexible strip. It is merely the external strip 21 which is depicted in the drawing. Such a design is characteristic for a so-called slotted cylinder so that as regards further details reference should be had to, for example, the German patent publication 4,206,751 A1.

The guide rail 15 and the longitudinal slot 7 are, in the present working embodiment of the invention, on sections 16 and 22 of the external surface adjacent to each other in the peripheral direction. The intermediately placed corner portion of the housing 1 is partially encircled by the L-like output drive part 12.

The linear path of travel of the output drive part 12 in relation to the housing 1 can be set in a predetermined manner in the working embodiment in either direction of movement (double arrow 23) by a device, referred to in the following as a limiting device 24, for limiting the travel of the output drive part 12. This limiting device 24 comprises, in the illustrated working embodiment, two limiting units 25, which are arranged in the direction of travel 23 on either side of the output drive part 12 on the housing 1. Each limiting unit 25 is responsible for limiting the stroke in one of the two possible directions of motion.

Each of the two limiting units 25 permits a stepless adjustment of the desired terminal position of the output drive part 12 in one of the two possible directions of travel. Since the structure thereof is identical, the following description will be restricted to one of the limiting units 25.

Each respective limiting unit 25 comprises a holder 26 with an essentially U-like configuration. It is mounted on the housing 1 within the section 16 of the external surface and straddles the guide rail 15. By means of gripping arms 27 and 27' corresponding to the two U limbs it straddles in each case an attachment rail 28 and 28' fixed to the housing, and fits or hooks behind the rail like a claw in an interlocking fashion. The attachment rails 28 and 28' are, in the illustrated working embodiment, constituted by rib-like projections, which are molded integrally on the housing 1 in the corner parts thereof and extend along the full length of the housing.

The holder 26 is sub-divided so that the two clamping arms 27 and 27' are movable in relation to one another. The connection between the so formed two holder sections is by way of at least one clamping screw 32. By screwing tight and releasing such at least one clamping screw 32 it is possible to change the clearance distance between the free ends of the clamping arms 27 and 27' and accordingly the holder 26 can be clamped or released on the housing 1 as required. In the released state the holder 26 may be locked on the housing 1 at any desired longitudinal position along an adjustment or setting range 33 from the side. In the illustrated working embodiment of the invention the adjustment range 33 is practically equal to the length of the housing.

On the holder 26 a unit or combination consisting of an abutment 34 and a shock absorber 35 is arranged, which extends into the path of motion of the output drive part 12. While it would be possible in principle to design the abutment 34 and the shock absorber 35 as a single component so that the shock absorber 35 would simultaneously perform an abutment function, for reasons of reducing wear and obtaining maximum working life it is more expedient to design the abutment 34 and the shock absorber 35 as separate parts as illustrated.

Both the abutment 34 and also the shock absorber 35 can be set steplessly in the direction 23 of motion the output drive part 12 in relation to the holder 26 and releaseably fixed in the desired relative positions. This renders possible a fine adjustment of the desired terminal positions of the output drive part 12. Coarse adjustment is performed by positioning the holder 26 in relation to the housing 1, and for certain reasons affording advantages may be performed in stages.

The guide rail 15 is provided with at least one row 36 of holes extending in the longitudinal direction thereof, the working embodiment possessing two rows 36 and 36' of holes extending in parallelism to one another and in the longitudinal direction 6 of the housing. In FIGS. 3 through 7 the reader will see sections of such rows 36 and 36' of holes on a larger scale. As more particularly illustrated in FIG. 3, the through holes 37 and 37' of such rows 36 and 36' serve to receive attachment elements 38 in the form of screws, by means of which the guide rail 15 is normally screwed to the housing 1. The head 42 of the attachment elements 38 assumes a position sunk into the associated hole 37 and 37' and bears against a step 43. The screw threaded shank 44 of the attachment element projects past the guide rail 15 toward the housing 1 and is screwed into a screw threaded hole 45, which is formed in a runner 46 moving along a longitudinal groove 47 in the section 16 of the external surface of the housing 1. The runner 46 and the longitudinal groove 47 are also depicted in FIG. 2. Each row 36 and 36' of holes is associated with an oppositely placed longitudinal groove 47, it being preferred to have one single bar-like runner 46 per longitudinal groove 47, which has all necessary screw threaded holes 45.

In order to prevent clogging of the holes 37 and 37' with dirt, same are shut off respectively by a removable cover 48, for example in the form of a cap, which may be thrust into the remaining free space above the head 42.

Figure 4:
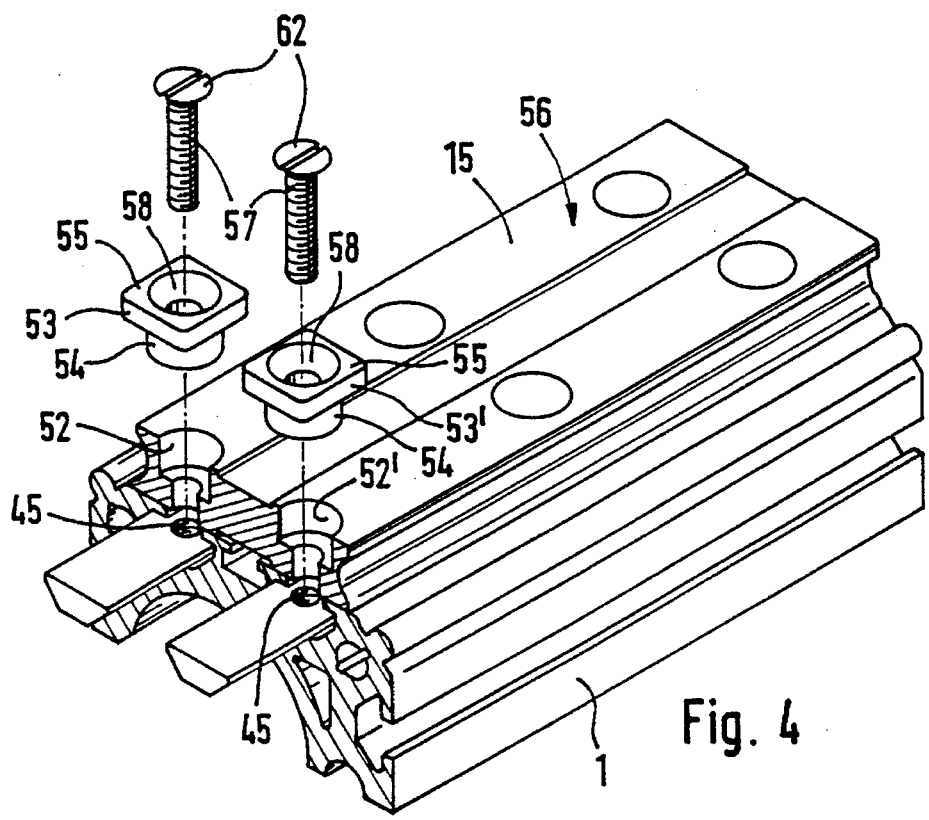
Figure 5:
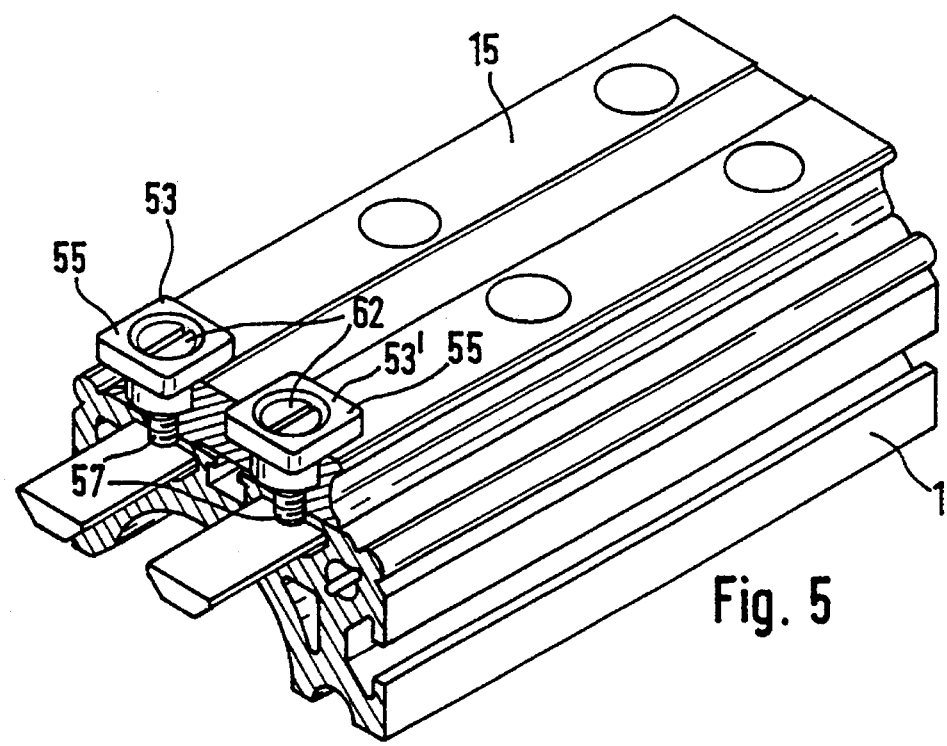

The holes 37 and 37' preferably simultaneously constitute positioning holes 52 and 52', which may be fitted as required with a support element 53 and 53' as depicted in FIGS. 4 and 5. Such support elements 53 and 53' designed in the form of separate components in relation to the positioning holes 52 and 52' and are provided with an anchoring shank 54, with which same may be set in an interlocking fashion in each desired positioning hole 52 and 52', after the attachment element 38 therein has been previously removed. Such a support element 53 and 53' inserted into a positioning hole 52 and 52' has its support head 55 extending upward past the guide rail 15 and practically constitutes a projection. The support head 55 preferably possesses larger dimensions than the anchoring shank 54 with the result that it represents a sort of annular collar, by which it bears against surface 56, facing away from the housing 1, of the guide rail 15.

Thus the user of the linear drive has a free choice as regards fitting the support elements 53 and 53' in any positioning holes 52 and 52'. In some circumstances it is possible to use the attachment element 38 which is already present. As a rule it will however be too short so that it is best to remove the attachment element 38 associated with the respective positioning hole 52 and 52', then to insert the support element 53 and 53' in the manner indicated and lastly to secure same by means of another, longer attachment screw 57. For this purpose the support element 53 and 53' has a continuous hole 58, through which the respective attachment screw 57 extends, which may be secured in the screw threaded hole 45 in accordance with the previously removed attachment element 38. The head 62 of the attachment screw 57 in this case bears against the support element 53 and 53' while being sunk into the hole 58 and will clamp the element against the guide rail 15. This final condition is illustrated in FIG. 5.

It will be seen that the support elements 53 and 53' may in this manner be anchored in any one of the holes 37 and 37'.

The support elements 53 and 53' are provided using a sort of interlocking cooperation to support the holder 26 against the force arising when the output drive part 12 impacts against the shock absorber 35 and the abutment 34. On the lower side (facing toward the guide rail 15) of its bar section 63 fitting around the guide rail 15, the holder 26, shown by way of example, therefore possesses two adjacently placed recesses 64 and 64', which are open toward the guide rail 15 and whose outline is preferably complementary to the outline of the support heads 55. The two rows 36 and 36' of holes in the guide rail 15 have the same distribution so that respectively two holes 37 and 37' are arranged adjacent to one another in the transverse direction. When in such a pair of holes 37 and 37' two support elements 53 and 53' are anchored, the holder 26 may be so mounted that the support heads 55 of the support elements 53 and 53' may fit into one respective one of the two recesses 64 and 64'. The corresponding setting of the holder 26 will be clear from FIG. 6. The placing in position of the holder 26 is performed from above by releasing the clamping screws 32 and moving the two clamping arms 27 and 27' a distance apart so that they may be mounted on the two attachment screws 28 and 28'. The holder positioned in this manner is additionally clamped in position by tightening the clamping screws 32.

The paired arrangement of the support elements 53 and 53' ensures the ability to resist substantial forces. More particularly in the case of small designs of such linear drives it is possible to have only one row of holes so that on the holder 26 as well a single recess will be sufficient in order to cooperate with a single suitably arranged support element.

Figure 6:
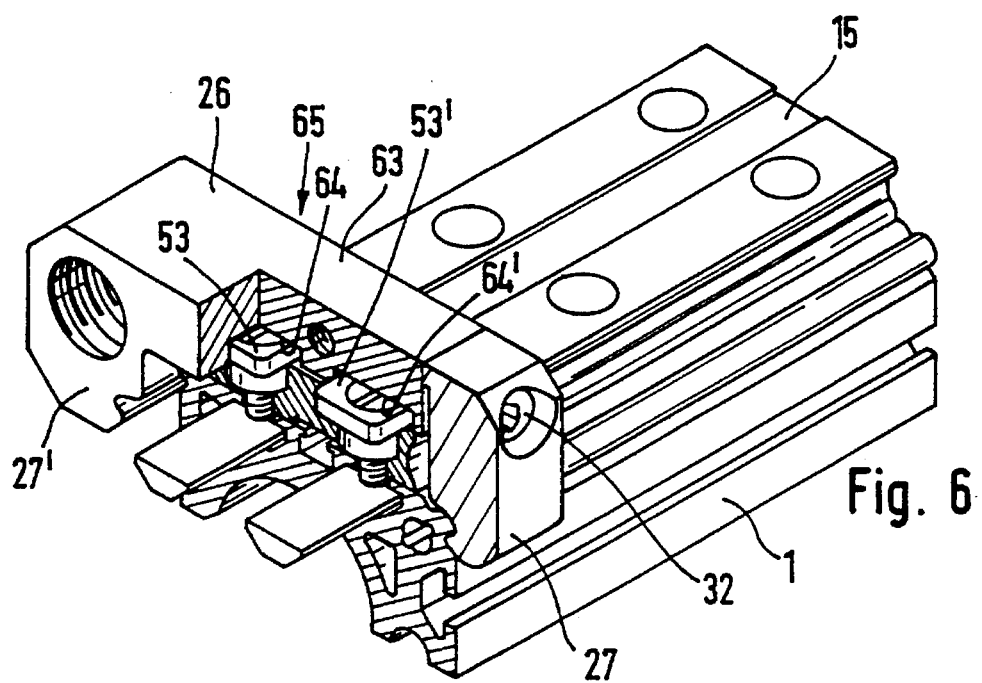
Figure 7:
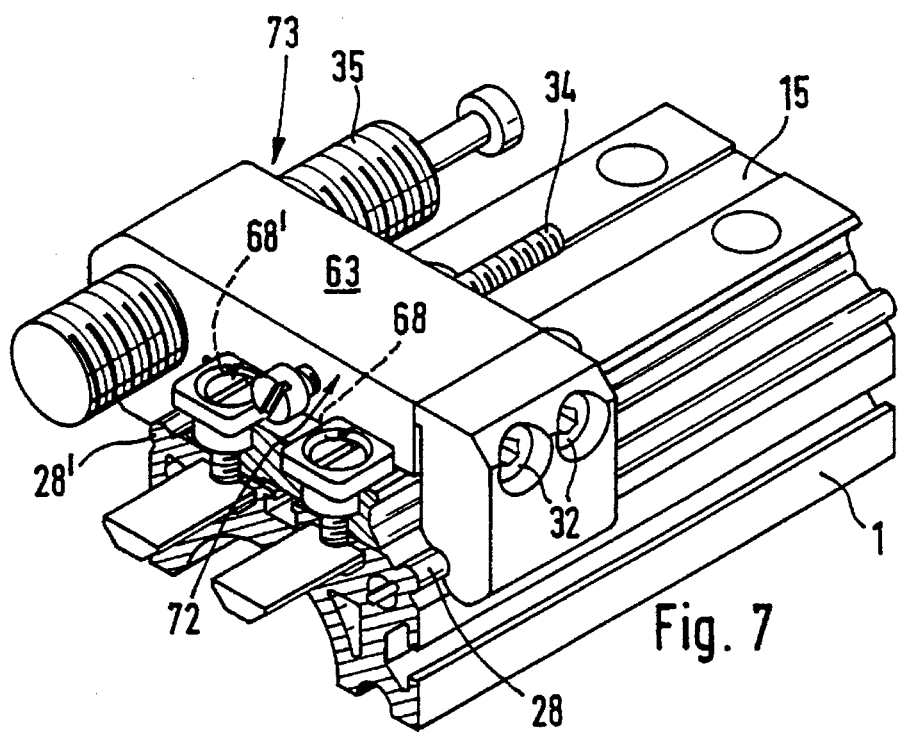
Figure 8:
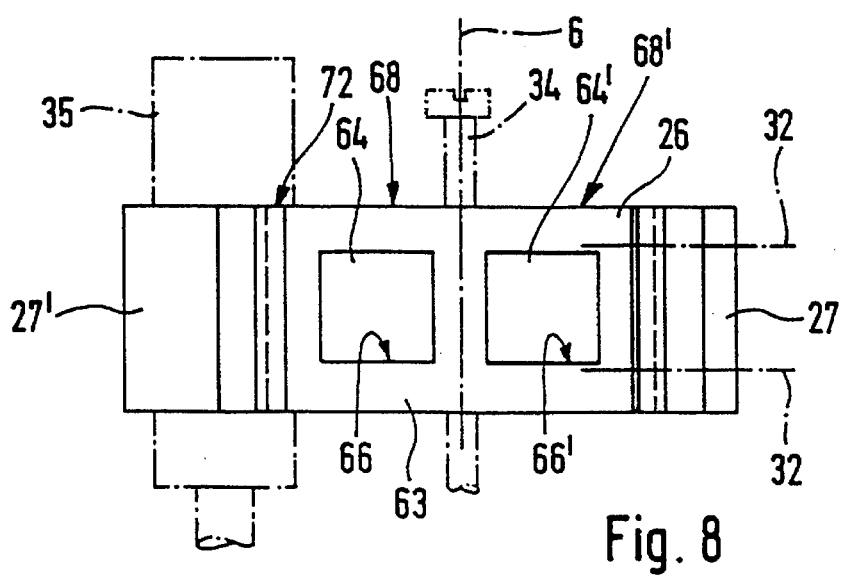
FIG. 8 shows a view from below of one of the holders looking in the direction of the arrow VIII in FIG. 2.

The position depicted in FIG. 6 of the holder 26 is taken to be the support setting 65. A respective support element 53 and 53' extending into a recess 64 and 64' fits or hooks around an engaging portion 66 and 66' of the holder 26, which is constituted by the edge, facing toward the output drive part 12, of the respective recess 64 and 64' (FIG. 8). Owing to the contact between the support elements 53 and 53' and the engaging portions 66 and 66' the holder 26 is reliably supported and will not be dislodged even by a substantial force in the longitudinal direction 6 of the housing.

The point, at which the holder is located on assuming a support setting 65, is for the present purpose termed the positioning point 67. The linear drive of the present working embodiment is provided with a plurality of positioning points 64 distributed along the length of the housing. They are to be found at all those positions at which a pair of adjacently arranged holes 37 and 37' is located. The user consequently has the possibility of securing the two support elements 53 and 53' in accordance with requirements at any one of such positioning points 67 in order to arrange the holder 26 in different support settings 65. The holder 26 may in this manner be fixed in a positive or interlocking and also a frictional manner at different longitudinal positions along the housing 1 in the path of motion of the output drive part 12.

One advantage of the design resides inter alia in that only so many support elements 53 and 53' are required as are employed for the mounting of the holder 26 in one support setting 65. At the other possible positioning points the guide rail 15 will remain attached in the manner indicated in FIG. 3 so that here there will be no projections, which might hinder the motion of the output drive part 12.

The engaging portion 66 and 66', just like the portion of the support element 53 and 53' cooperating with same, preferably has a flat form in a direction athwart the longitudinal direction 6 of the housing. It is in this fashion that support over a major area is possible with a low pressure per unit area. In this connection it is to be recommended to have the rectangular outline, illustrated in the figures, with a more particularly square periphery of the support heads 55 and, respectively, recesses 64 and 64'.

The working embodiment is furthermore characterized by the feature that a respective holder 26 may be positioned in cooperation with support elements 53 and 53' fixed in the same holes without any changes, in different support setting 65, which correspond to different longitudinal positions. This possibility may for instance be ensured if on the lower side of the bar section 63 a plurality of recesses 64 and 64' is provided placed in sequence in the longitudinal direction 6 of the housing so that the holder 26 may be mounted simply by changing over its position. The working embodiment provided by way of example provides a further engaging portion 68 and 68' for each respective support element 53 and 53', which portion for the sake of simplicity may not be formed by the edge of further recesses and is formed by the rear terminating surface 72 of the holder 26 opposite to the output drive part 12. It is in this manner that, with respect to each respective pair of support elements 53 and 53' and in addition to the support setting 65 as in FIG. 6, the further support setting 73 (illustrated in FIG. 7) is possible, in the case of which the holder 26 is set in front of the support elements 53 and 53', its end surface 72 resting against same.

This end surface 72 may be additionally employed to set the position of the holder 26 independently from one of the above described support elements 53 and 53' in a support setting rendering possible maximum travel of the output drive part 12. For this purpose on the associated end plate 2 there is a permanently fixed transverse heel 74, which extends into the possible path of motion of the holder 26 in relation to the attachment rails 28 and 28'. It assumes the function of a support element, since the holder 26 may be moved so that its end surface 72 comes into engagement with it.

In the illustrated working embodiment of the invention the abutment 34 and the shock absorber 35 are elongated components, which are so mounted on the holder 26 that they extend in the longitudinal direction 6 of the housing. It is a question of components preferably having a cylindrical outline, which are mounted in receiving holes 75 and 76, which extend through the holder 26 in the longitudinal direction 6 of the housing. Both the abutment 34 and also the shock absorber 35 can be steplessly reset in position in the longitudinal direction 6 of the housing and accordingly in the direction 23 of travel of the output drive part 12 in relation to holder 26 and locked firmly in any desired position of adjustment.

Since both components may be made relatively compact, one might consider having a clamping device on the holder for locking in a respective position of setting, such clamping device securely locking the components, owing to the high surface pressure, even if same are able to be axially shifted in relation to the holder after releasing the clamping means. Simpler and more reliable handling is however more readily possible with the illustrated design, in the case of which the abutment-shock absorber unit 34 and 35 is arranged at least additionally as part of an interlocking connection on the holder 26. In the specific case both receiving openings 75 and 76 have an internal screw thread 77 and both the abutment 34 and also the shock absorber 36 possess an external screw thread 78 for screwing into the associated receiving hole 75 and 76. In the illustrated working embodiment of the invention the abutment 34 is a screw threaded pin, which is represented by a screw, which may be screwed using a customary power screw driver or by hand into the respective receiving opening 76 for assembly in order to change the axial position in relation to the holder 26.

The shock absorber 35 in the working example of the invention possesses a cylindrical housing 82, which bears an external screw thread 78 and which just like the abutment 34 is received in the associated opening 75 by screwing for assembly. On the end surface facing the output drive part 12 a rod 83, which is able to be moved longitudinally in relation to the housing 82, projects toward the output drive part 12 and at the free end bears an impact body 84.

The abutment-shock absorber unit 34 is accordingly able to be adjusted longitudinally and steplessly using a screw threaded connection 77 and 78 in the housing's longitudinal direction 6, setting in place being performed by simply rotating the respective component. Simultaneously using this screw threaded connection and the screw threads in engagement with one another an interlocking support action is provided in relation to holder 26 so that accidental shifting is not possible even in the case of major impact forces.

The setting of a desired terminal position of the output drive part 12 is performed in such a manner that firstly the holder 26 of a respective limiting unit 25 is fixed at that positioning point 67, which is nearest to the desired terminal position. Following this the abutment 34 is so positioned that the output drive part 12 reaches its terminal position, when it strikes against such abutment 34. The positioning operation is performed steplessly by simply turning the abutment 34 in relation to the internal screw thread 77 of the associated receiving opening 76. Then the shock absorber is so reset that the same reduces the kinetic energy of the output drive part 12 even before impact against the abutment 34. For this purpose the setting made is such that the impact body 84 is set further in front of the holder 26 than the end side of the abutment 34. Since in the case of the shock absorber 35 there is a screw threaded connection with the holder 26, there is an interlocking supporting action, which prevents any undesired dislodgement. The manner of operation of the shock absorber 35 is conventional and is not in need of any further explanation. On impact of the output drive part 12 the impact body 84 is shifted toward the holder 26 with the result that the damping process takes place in the housing 82.

In order to be certain that the abutment-shock absorber unit 34 and 35 is not turned by accident and therefore loses its end setting, it is possible for the screw threads 77 and 78 to be so designed or coated that rotation thereof is braked.

It would also be possible to have an additional clamping device on the holder 26 which would prevent such rotation frictionally. In the illustrated working embodiment of the invention at least one lock nut 85 is mounted on each external screw thread 78 and may be screwed against the holder in order to lock the associated component in place. It is possible to provide a lock nut both for the rear side and also for the front side of the holder 26 as an alternative or in combination.

The limiting device 24 in the present example may therefore be practically adjusted along the entire stroke of the output drive part 12 and renders possible an extremely flexible or adaptable presetting of desired end settings. Its design does not substantially impair the usefulness of the linear drive with the result that the other sections of the outer surface are still available for other purposes, such as for mounting sensors or further devices.

We claim:

1. A linear drive comprising a housing which contains a drive part coupled kinetically with an output drive part which is movingly arranged outside the housing on a longitudinal guide extending in the longitudinal direction thereof, a device arranged outside the housing and cooperating with the output drive part for limiting the travel of the output drive part, which device comprises at least one holder adapted to be set in fixed relationship to the housing along a setting range in different longitudinal positions, and an abutment-shock absorber unit arranged on the holder and extending into the path of travel of the output drive part, wherein a plurality of spaced positioning points is provided along the range of setting, at which respectively at least one support element is or may be arranged in fixed relationship to the housing, the holder is adapted to be arranged and to be secured at each of these positioning points, which are provided with at least one support element, in at least one support setting corresponding to a given longitudinal position, in the support setting an engaging portion provided on the holder is hookingly engaged by the associated support element on the side facing away from the output drive part and is supported in the longitudinal direction, and furthermore the abutment-shock absorber unit is arranged on the holder for stepless adjustment in the direction of travel of the output drive part.

2. The linear drive as set forth in claim 1, wherein the abutment-shock absorber unit is mounted on the holder by means of a connection acting in an interlocking manner.

3. The linear drive as set forth in claim 1, wherein the abutment-shock absorber unit is mounted on the holder by means of a screw threaded connection in a steplessly adjustable fashion and with an interlocking supporting action.

4. The linear drive as set forth in claim 3, wherein the abutment-shock absorber unit is provided with at least one external screw thread by which it is engaged with a respective internal screw thread provided on the holder.

5. The linear drive as set forth in claim 4, wherein the respective external screw thread bears at least one lock nut, by which it may be brought into clamping engagement with the holder.

6. The linear drive as set forth in claim 1, wherein the abutment and the shock absorber of the abutment-shock absorber unit are designed separately from one another and are able to be reset independently of each other in the direction of travel of the output drive part.

7. The linear drive as set forth in claim 1, wherein the holder is provided with a plurality of engaging portions spaced out in the direction of travel of the output drive part and at the at least one support element provided at one positioning point may be positioned in a plurality of support setting corresponding to different longitudinal positions, in which support settings the associated support element hooks around and bears against different engaging portion of the holder.

8. The linear drive as set forth in claim 1, wherein each respective support element forms a heel.

9. The linear drive as set forth in claim 8, wherein at least one engaging portion is formed by the edge of a recess formed in the holder, into which the heel fits, more particularly in an interlocking fashion.

10. The linear drive as set forth in claim 1, wherein at the respective positioning point at least two support elements are or may be provided which extend athwart the direction of travel of the output drive part.

11. The linear drive as set forth in claim 1, wherein at least one row of holes, fixed in relation to the housing is present, whose holes are located at the positioning points and constitute positioning holes for supporting the holder.

12. The linear drive as set forth in claim 11, wherein the at least one support element is a component separate from the positioning holes and may be set in each desired positioning hole in an interlocking fashion.

13. The linear drive as set forth in claim 12, wherein the at least one support element possesses an anchoring shank and a support head, is anchoring shank being able to be so fitted in an associated positioning hole that the support head is outside the positioning hole for cooperation with at least one engaging portion of the holder.

14. The linear drive as set forth in claim 13, wherein the support head possesses a preferably square outline.

15. The linear drive as set forth in claim 12, wherein the support element has an attachment screw extending through it, which screw is able to be fixed in place in a screw thread arranged as an axial prolongation of the positioning hole.

16. The linear drive as set forth in claim 12, wherein the at least one row of holes is provided on a guide rail constituting a longitudinal guide for the output drive part and fixed in relation to the housing and wherein the holes of the row serve to receive attachment elements, by which the guide rail is secured to the housing, such holes being at least partially able to be employed as positioning holes and in accordance with requirements may be fitted with a support element.

17. The linear drive as set forth in claim 16, wherein the support element has an attachment screw extending through it, which screw is able to be fixed in place in a screw thread arranged as an axial prolongation of the positioning hole and wherein the attachment screw for such support element is simultaneously adapted to function as an attachment element for the guide rail.

18. The linear drive as set forth in claim 1, wherein in each respective support setting the holder is adapted to be detachably secured to the housing by means of a clamping device.

19. The linear drive as set forth in claim 18, wherein the holder is provided with two clamping arms, by means of which it may be clamped using an attachment rail and/or attachment groove integral with the housing and made separately from the guide rail.

20. The linear drive as set forth in claim 1, comprising two such limiting units each having such a holder and such an abutment-shock absorber unit, such limiting units being arranged on sides of the output drive part which are opposite as related to the direction of travel.

* * * * *